D. J. G. MILLER AND R. A. LLOYD.
GRINDING OR CRUSHING MACHINE.
APPLICATION FILED MAY 21, 1918.
1,304,345.
Patented May 20, 1919.
8 SHEETS—SHEET 7.
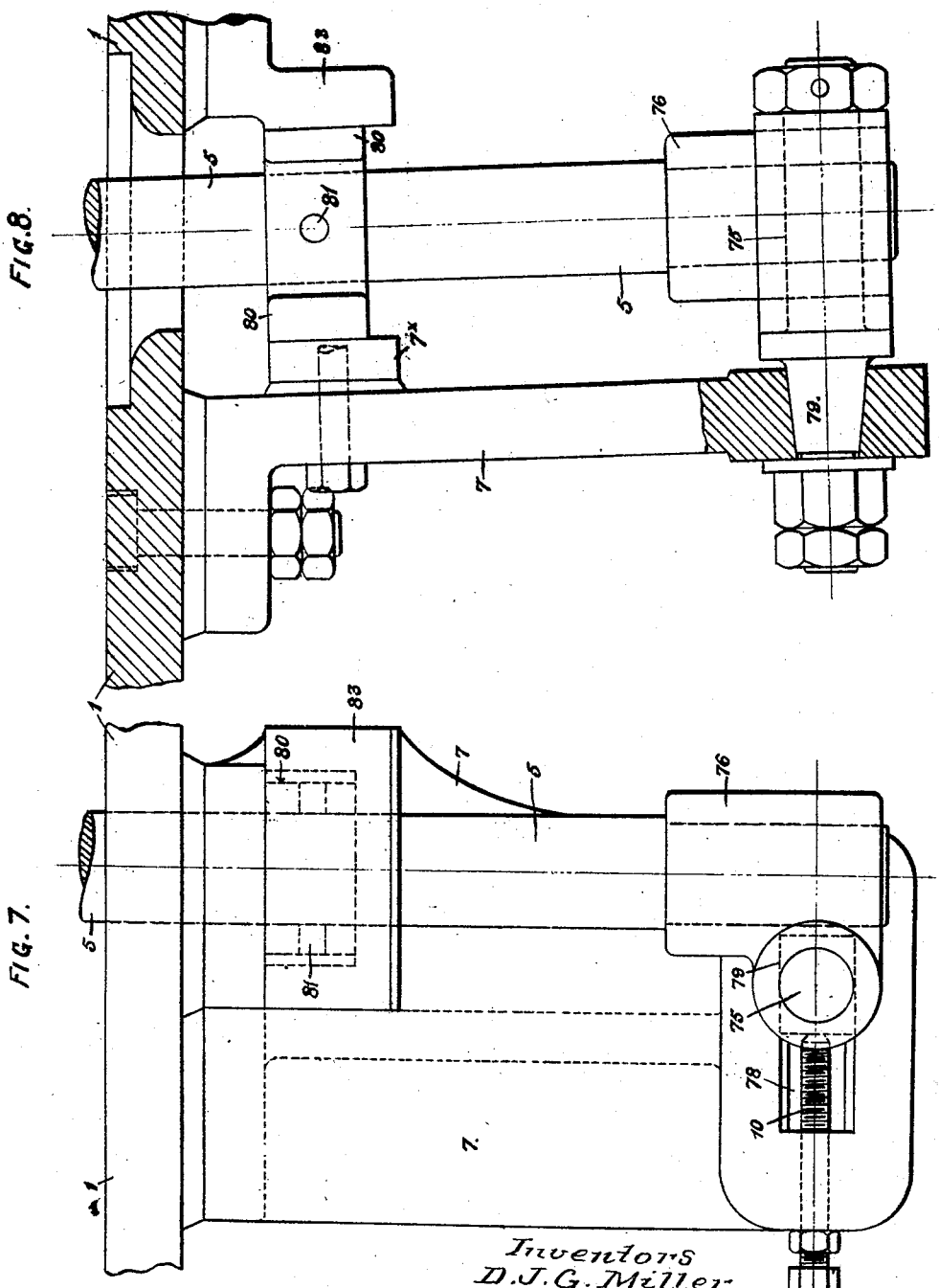
Inventors
D. J. G. Miller
R. A. Lloyd
By
their Atty.

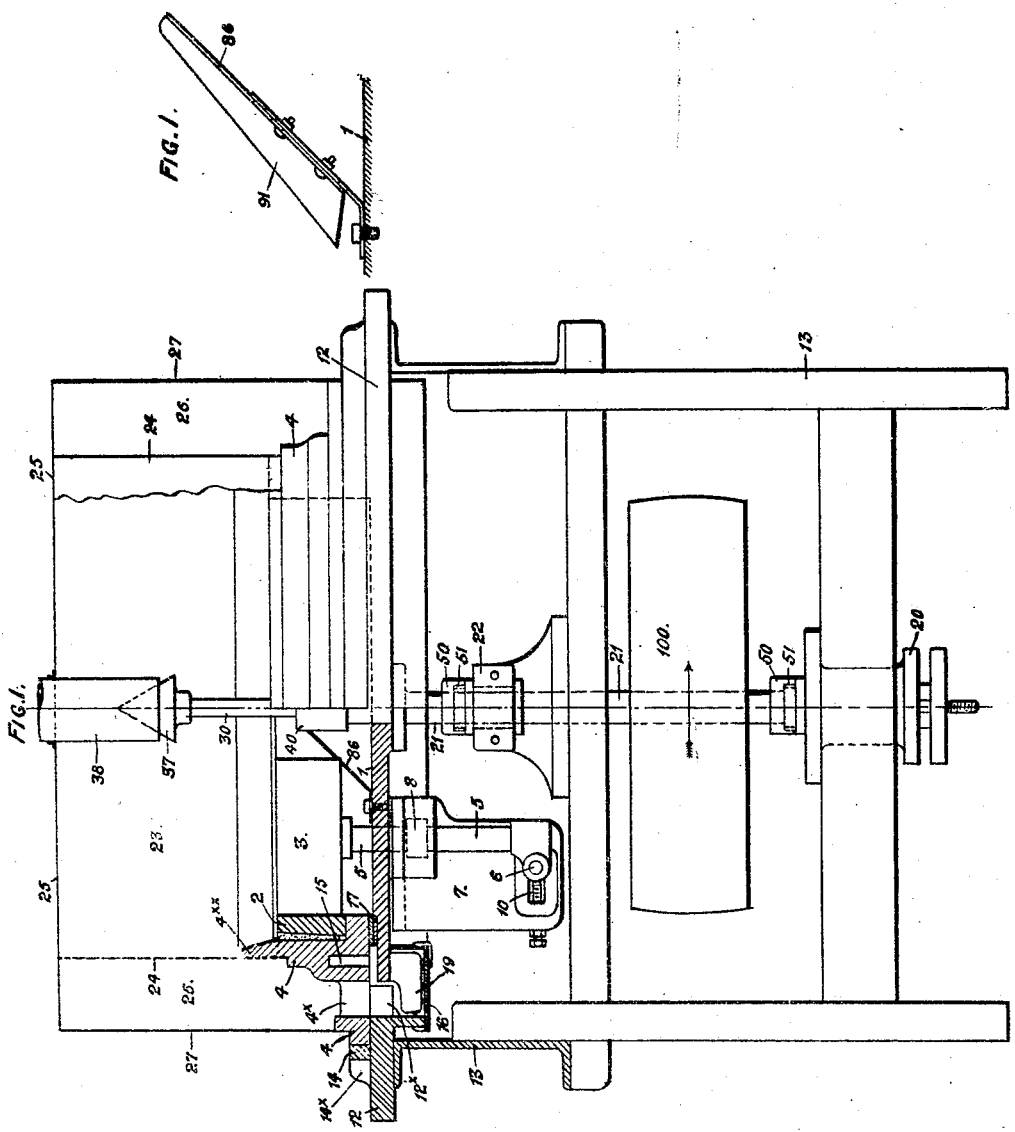

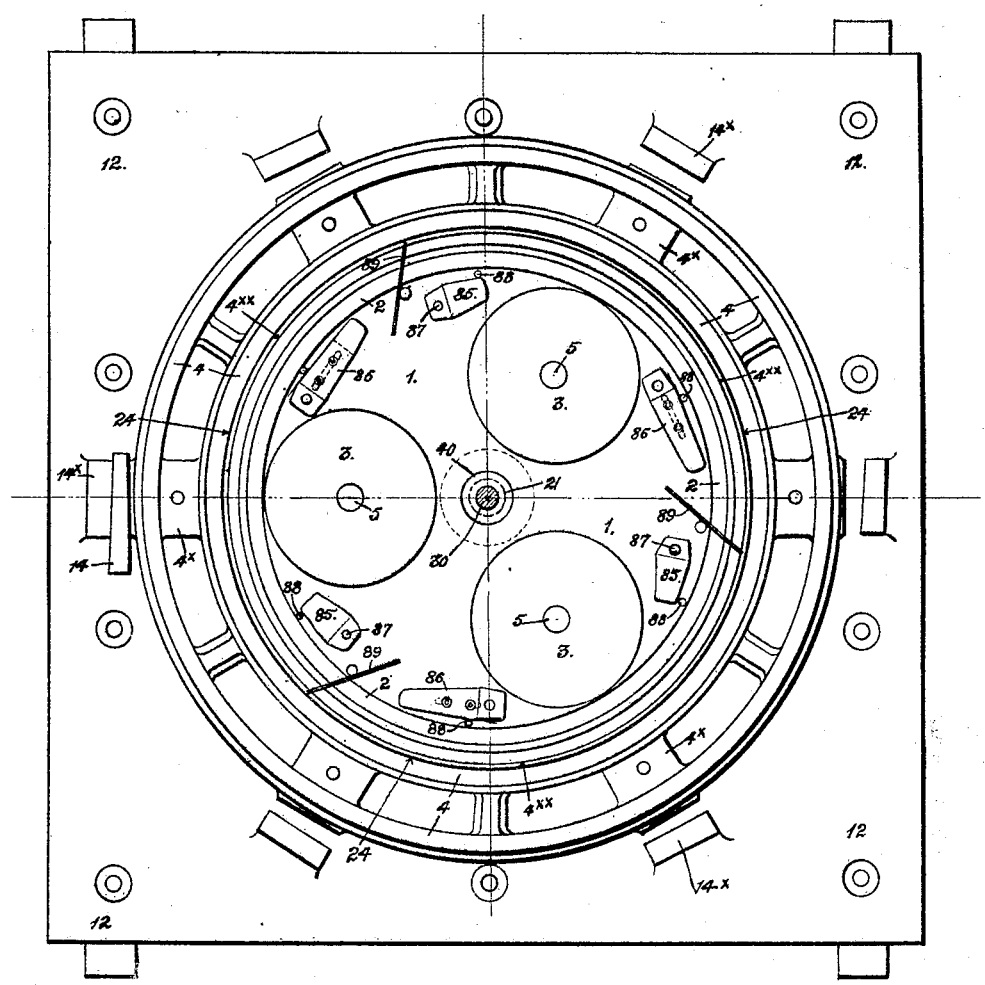

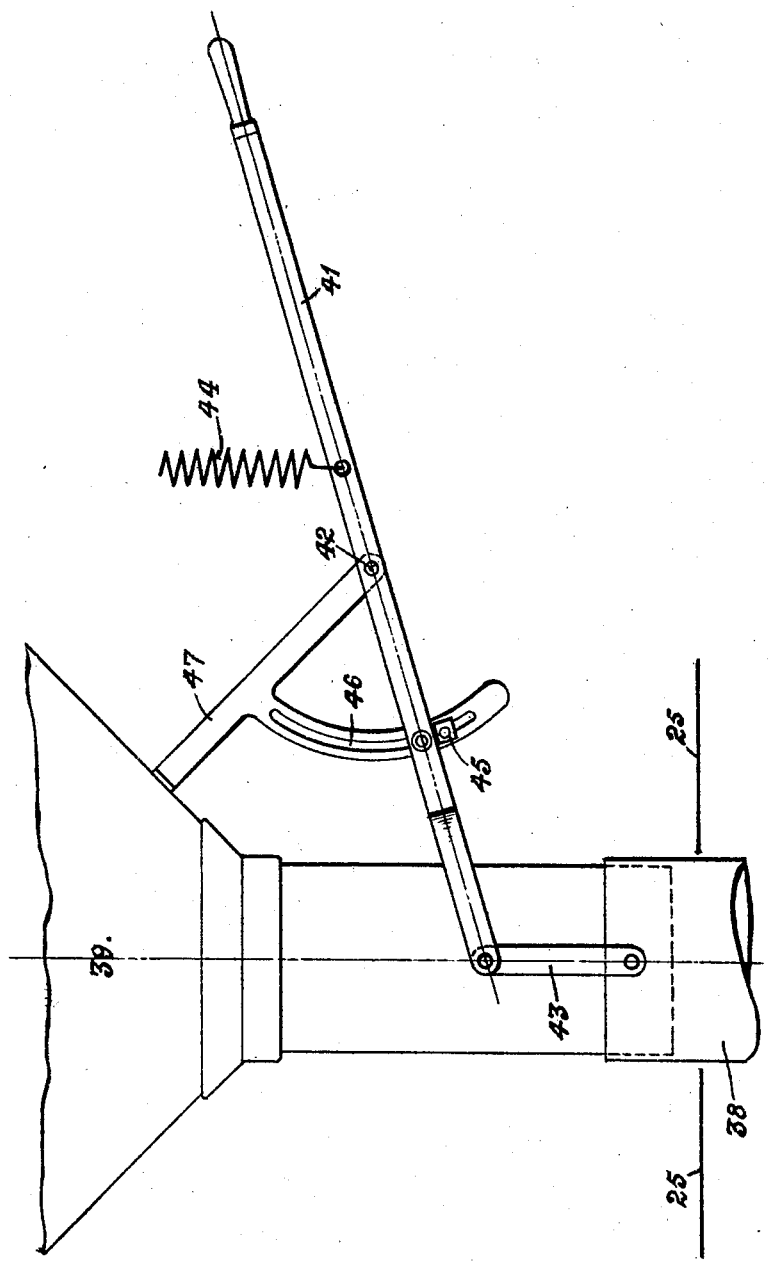

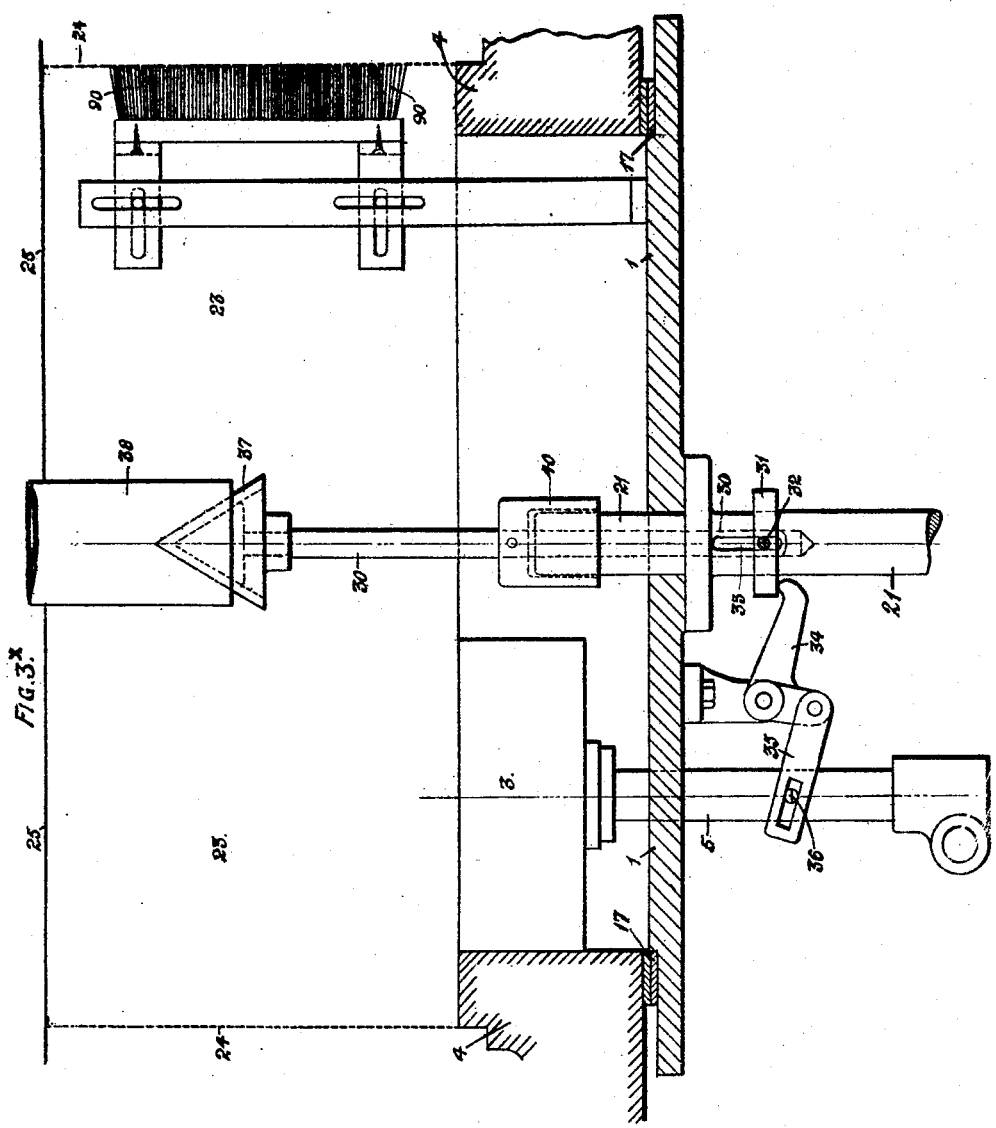

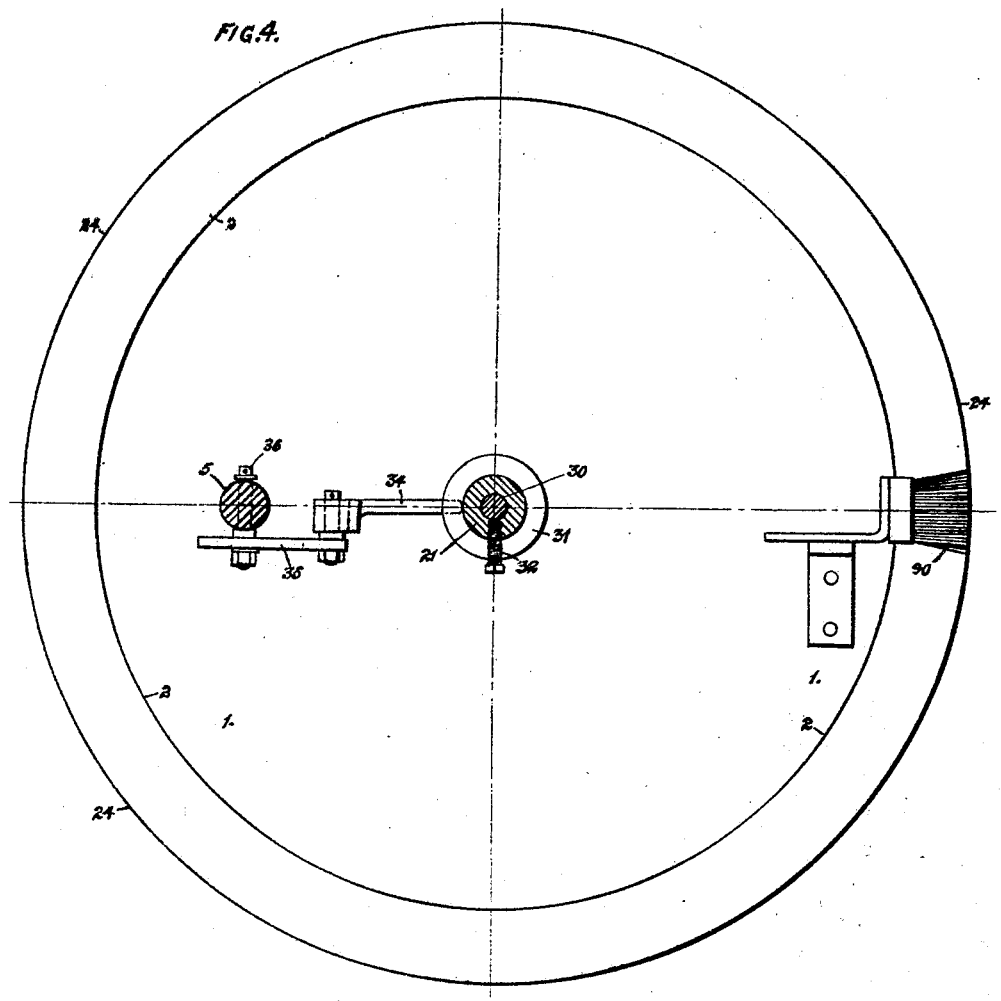

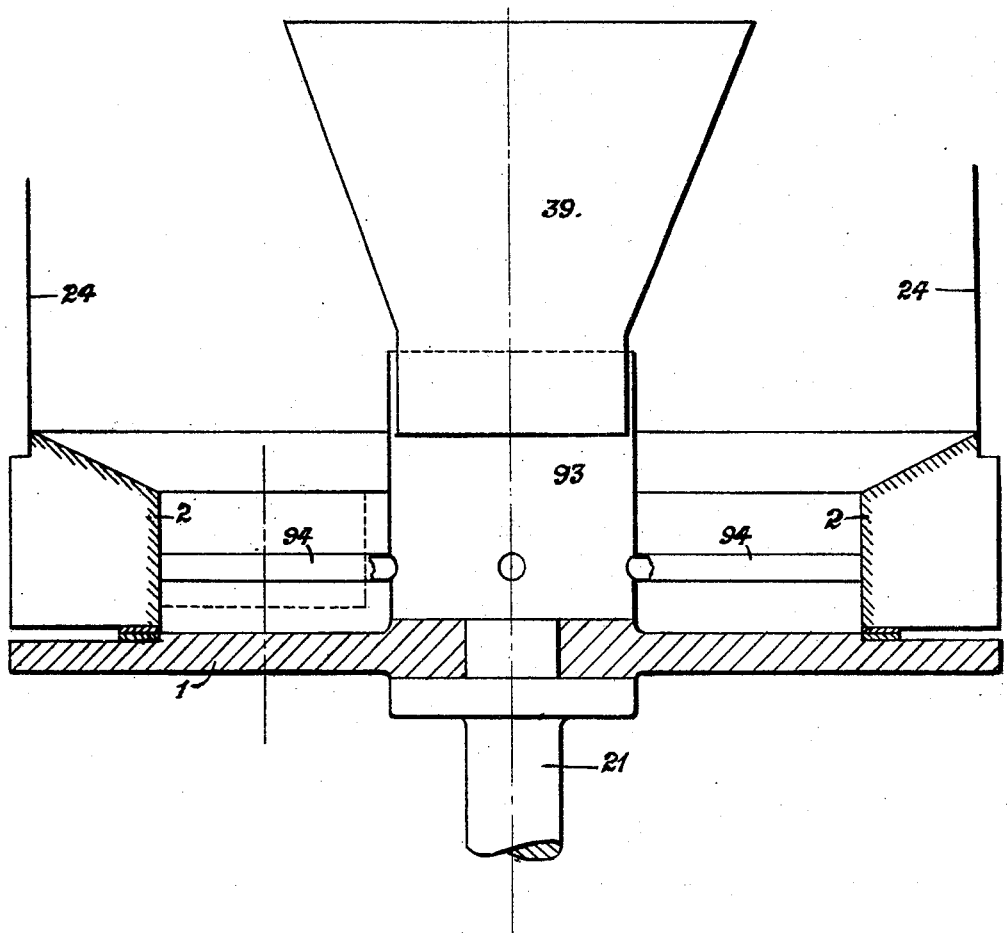

UNITED STATES PATENT OFFICE.

DONALD JOHN GUNN MILLER, OF BOOTLE, AND RICHARD ASSHETON LLOYD, OF LIVERPOOL, ENGLAND.

GRINDING OR CRUSHING MACHINE.

1,304,345. Specification of Letters Patent. Patented May 20, 1919.

Application filed May 21, 1918. Serial No. 235,842.

*To all whom it may concern:*

Be it known that we, DONALD JOHN GUNN MILLER and RICHARD ASSHETON LLOYD, subjects of the King of England, and residing at Bootle, in the county of Lancaster, England, and Liverpool, in the county of Lancaster, England, respectively, have invented Improvements in Grinding or Crushing Machines, of which the following is a specification.

This invention has reference to mills or milling machinery for grinding or pulverizing substances, and more particularly hard substances, instances of which are slag, cement, rock, ore, minerals, and similar substances; but at the same time the invention hereinafter described, may be used for the crushing, grinding or pulverizing of any substances to which it may be applicable. The invention further relates to that type of machine in which the reduction or crushing of the material is effected by means of a roller or rollers supported and revolved on arms or carriers pivoted to a revolving shaft or part, and forced against a grinding ring or path due to centrifugal force imparted to the rollers, causing them to be pressed against the ring or path; the material after reduction or pulverization to a granular condition or impalpable powder, being discharged through a mesh work screen.

Figure 1 is a side elevation of apparatus embodying the invention, parts being shown in section, Fig. 1ª is a side elevation of a deflector, Fig. 2 is a plan view of the apparatus.

Fig. 3 is a side elevation of means to vertically adjust the feed spout,

Figure 5:
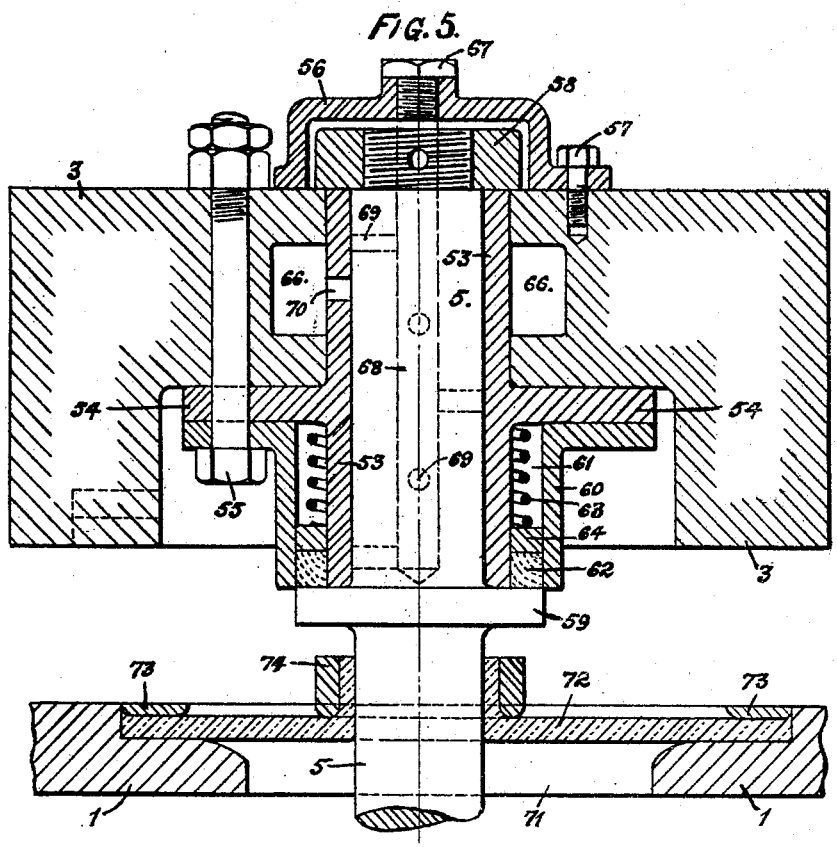
Figure 6:
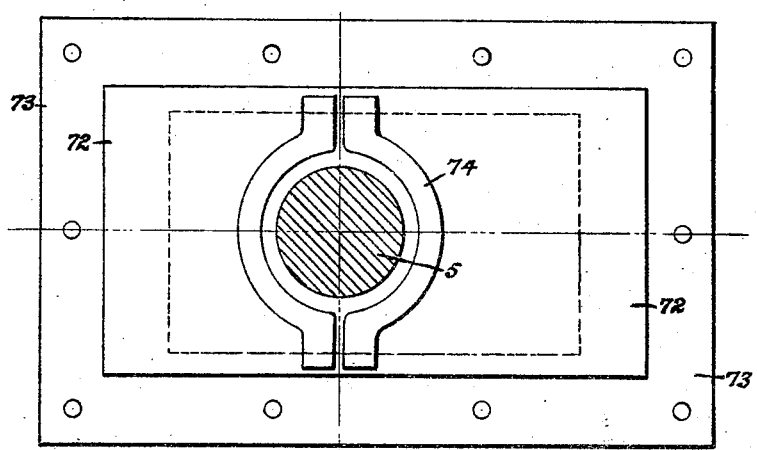

Fig. 3× is a side elevation of the means to automatically move the feed valve, associated elements being in section, Fig. 4 is a plan view of the operating means for the feed valve, Fig. 5 is a central vertical sectional view through one of the rolls, Fig. 6 is a plan view of a section of rubber serving to close an opening in the rotatable bottom, Fig. 7 is a side elevation of a vertical spindle or shaft and associated elements, Fig. 8 is a similar view, taken at a right angle to Fig. 7, and, Fig. 9 is a central vertical sectional view through a different form of apparatus, parts being omitted.

The material to be reduced or ground (which in some cases may be already semifine) is fed onto a revolving receiving table or bottom 1, it being fed into the machine in the manner and by the means hereinafter described with reference to Fig. 3 onto the center of the revolving table or pan bottom 1, and thus it is set into motion circularly, and also centrifugally toward the stationary crushing or grinding ring, marked 2.

The crushing rollers 3 are carried and revolve with the pan bottom 1, and so while the material will by this means pass onto the crushing surface or ring 2, it is also carried around bodily with the reducing or crushing rollers. Hence if the amount of material introduced into the crushing or grinding portion of the mill be very large, and more than is required normally, the strain on the rollers 3, due to the presence of this large or abnormal quantity is not nearly so great as it otherwise would be.

The crushing ring 2 is removable, and is set and fixed in an outer angle shaped frame 4 by Babbitt or similar metal or other fastening means, and the lower edge of the ring proper 2 stands a little above the table or bottom 1. This bottom or table, and the lower part of the frame 4 and the ring 2 constitute the pan, the rings being stationary; and the roller upper and lower surfaces, lie within the planes of the lower and upper edges of the crushing ring.

In Fig. 1 the rings 2 and 4 are shown practically flush with the top of the rollers 3, but in some cases if desired, these rings, or say the ring 4 may be provided with an upwardly projecting part $4^{xx}$, having a beveled edge which will receive the centrifugal stream of crushed material coming from the crushing surface of the ring 2, so as to protect the screen at its lower part from the abrasive action of the centrifugal material.

The rollers 3, of which there are three in the case shown, are carried by the bottom plate 1, by supporting arms or carriers 5, which are pivoted at 6 to brackets 7 fixed on the under side of the bottom 1, and extend up through guides 8 fixed on the brackets, which take the circular thrust—and other strain—due to the rotation of the bottom and rollers, and the "work." The rollers 3 are mounted, as shown, on their shafts or carriers 5 a slight distance above the bottom 1.

The pivots or joints 6 of the roller arms or carriers 5—the construction and arrangement of which is hereinafter described—are adjustable radially to the vertical axis of the machine by set screws 10; or other like means may be employed.

The roller arms or carriers 5 are thus supported at two points, namely, one near the roller itself, and the other at the opposite end where they are pivoted.

The crushing ring carrier ring frame 4 consists of two ring parts, with bridge parts 4× between them and connecting them; and this frame is supported and fixed on a stationary base or bed plate 12 carried on the general frame 13 of the machine; and where the bridge parts 4× come, the frame 12—the inner edge of which is flush with the inner edge of the outer part of the ring 4—is provided with lugs 12×, to which the bridge bars 4× are fastened by bolts or studs; and the ring frame 4 is also secured in position in the base 12 by keys 14 driven in between the outside of the ring 4, and lug projections 14× on the table 12.

The ring 4 may have an annular groove in its under face for carrying a packing; and in the case shown, this groove is provided and marked 15, and this packing may be adapted to be pressed by a spring onto the table's upper surface, near its periphery; or rubber or any other kind of packing may be used so as to form a dust-tight joint between the ring 4 and the pan bottom 1.

When a complete dust-tight joint is not required, the dust which passes between the ring 4 and the pan bottom 1 will pass into the receiver into which the reduced powder from the general delivery of the machine passes.

This receiving part or chamber in the case shown consists of an annular channel-shaped chamber 16, which is secured as shown to a depending flange on the under side of the base plate 12.

In the case shown, the upper side of the table 1 and the under side of the ring 4, are each provided with a ring 17, the faces of which may touch, or nearly touch, and which will be fastened in a readily detachable manner to the table and the ring, such as by counter-sunk screws. The meeting faces of these rings form a rough working joint between the revolving and stationary parts of the pan; but what dust may pass between them—as it will at least when slightly worn—will pass into the powder chamber 16. Vertical adjustment however of the pan bottom 1 is provided for, by an adjustable footstep bearing 20, carried in the frame 13, in which the lower end of the main carrying and driving shaft 21 of the machine works, and is supported vertically; its upper end being supported by a bearing 22.

The main screen chamber is marked 23, and is formed by the cylindrical screen 24 of considerably larger diameter than the crushing surface of the crushing ring 2 and fixed on the ring frame 4, and a roof plate 25; and the powder receiving chamber 26 is formed outside the screen by the outside casing or cylinder 27, fixed on the ring frame 4 and to the outer part of the roof plate 25.

As constructed and shown, the ring frame 4 and crushing ring 2, and the parts just described fixed upon it, can readily be lifted off the bed 12, and so that access is had to the interior of the pan, and the rollers, and internal parts generally of the machine.

The supply of material to the mill is controlled by the presence of the quantity of material in the mill pan being operated upon; namely, the position or inclination of the axes of the rollers 3 and their carrier arms, in relation to the vertical central axis of the mill, will depend upon the quantity of the material in the pan and being operated upon; the greater the quantity, the more will be the thickness of the material between the surface of the grinding ring 2, and the rollers 3; and when there is a relatively large quantity on the surface of the ring 2, the rollers are moved inward toward the mill axis, and a part of, or acted upon by or through the roller carriers or arms 5 will cause a device controlling the supply of the material being reduced, to be moved, so as to more or less close the material supply orifice or area, and diminish the supply.

One example of parts by which this manner of self regulating feed is effected, is illustrated in Figs. 3, 3× and 4. In this case a central rod 30 extends up from the upper end of the pan bottom carrier shaft 21, the lower end of this rod lying within an axial hole in the shaft, and within which it is vertically movable; and this inner rod is raised and lowered through a ring 31 which is fixed by a pin 32 to the rod 30, passing through the ring 31 and a slot 33 in the shaft 21; and this ring is operated by a bell crank 34 pivoted on the bottom of the pan 1 by a bracket, and which itself is operated by a bar 35 which is fixed on the roller carrying arm 5, the bar 35 having a pin 36 fixed in a slot in it, which passes loosely through a hole in the arm 5, in which it can turn freely; so that as the arms 5 move inwardly due to the presence of material between the roller 3 and the pan wall or ring 2, the bell crank 34 will be moved, and the ring 31 and rod 30 will be raised. The rod 30 has a cone 37 on its upper end—which may be plain or fluted—which constitutes a feed or distributing device, and which fits within the lower part of and works vertically up and down in a material supply tube 38 fixed in the roof 25 of the chamber 23, and having at its upper end a hopper 39. The position of the cone 37 in the tube 38 regulates an annular space between it and the tube, which constitutes the annular area for the feed of the material onto the pan bottom 1; and this cone may if desired be above the roof 25.

A dust cap 40 is provided on the rod 30 and fits over the upper end of the driving shafts 21.

The hopper 39, and its depending tube or spout, are stationary, and the tube or spout 38 is adapted to be moved vertically, and adjusted by hand, so that the feed area between it and the cone 37 can be set and regulated, in conjunction with the automatic feed action just described, or without it; and this hand feed mechanism consists of a hand operated lever 41 pivoted at 42, and connected at its outer forked end to the tube 38 by links 43; so that by pulling the lever down by hand, it will lift up the tube 38, and increase the area of feed. Its lowering action is effected by a spring 44 (or by a weight) which normally presses the arm of the lever 41 connected to the tube 38 down; its lowermost position being regulated by an adjustable stop 45 carried in a slotted quadrant 46 on the arm or bracket 47 which carries the lever pivot 42. By adjusting the stop 45, the minimum limit of opening between the tube 38 and the cone 37 can be effected. The cone 37 may be fluted or it may be plain, but as it revolves with the shaft or rod 30 and the pan bottom 1, its rotation insures a proper feed of material, through the annular feed area or space.

In connection with the driving shaft 21, and the bearings 22 and 20, dust excluding means are provided, consisting of inverted cups 50 on the shaft, fitting over projections 51 on the bearings, so that any falling dust cannot get into the bearings.

With regard to the rollers 3, these in one construction have special characteristics. This construction with the lubricating features, supporting arrangements, carriers, and means for forming a closure between the roller carrier arms and the pan bottom 1, is illustrated in detail in Figs. 5 to 8.

The roller 3 consists of an outer part forming the body, and an inner sleeve 53, having a flange 54 between its ends; and the roller body is recessed at the central lower part, and the upper surface of the flange 54 fits and rests against the roof of this recess, and is secured to it by bolts 55. The upper edge of the sleeve 53 is flush with that of the roller body; and above this part and the upper end of the carrier arm 5, is an inclosing cap 56, secured to the roller 3 by studs 57; and within this cap is the upper end of the arm 5, and a roller fixing nut 58 screwing on to same. Between this nut and a collar 59 on the arm 5—against which the lower end of the sleeve 53 bears—the roller is vertically supported and revolves, the sleeve 53 forming a bush to the roller, and it works on the journal of the outer end of the arm 5.

Outside the lower part of the sleeve 53 there is fitted and fixed an angle neck ring 60, secured to the sleeve by the bolts 55 and forming an annular recess 61 between the sleeve and this ring; and in this annular recess or space a packing 62—preferably of the soft kind—is fitted, which is pressed down onto the collar 59, and makes a fluid tight joint with it, by the spring 63 and ring 64.

This construction of the rollers with packings provides an automatically acting and hermetically sealed construction; and further, in the construction shown, the roller is provided with an internal oil well 66 of annular form, to which lubricant is supplied through an opening—normally closed by a stopper 67—in the cap 56, and a hole 68 bored in the arm 5, and radial holes 69 in it at different points leading to the surface of the sleeve or bush 53; a port or ports 70 through the sleeve making communication between the arm surface and oil chamber 66.

The openings 71 are provided with a closing means, so adapted as to enable them to move radially outward in the pan bottom. These openings are of considerable radial length and wider than the arm, and the closure or joint between the pan and the arm is of a removable kind; and in the case shown the closing device consists of a rubber sheet 72 fitted at its outer edge in a recess in the bottom 1 around the opening 71, and clamped and held in place by a frame 73 on the bottom; at its center it is secured to the arm by a clamping ring 74.

In lieu of the rubber plate 72, a flexible metal plate may be attached similarly to the arm 5, and adapted to slide in a recess between a frame as 73, and the bottom of the recess in the bottom 1.

Referring now to the pivot support 6 and guide 8 of the arms 5, these are shown in detail in Figs. 7 and 8.

The pivot consists of a fixed pin 75, on which a socket fitting 76 is mounted, in which the lower end of the roller arm 5 is fixed; this portion of the pivoted socket being nearer the mill axis than the horizontal pivot pin 75. The pin 75 has a rectangular shank 79 adapted to slide or be moved by the adjusting screw 10 along the slot 78 formed in the bottom of the bracket 7, and when adjusted to the required position, the shank 79, which is tapered, is drawn up tight, and so fixed in the bracket.

The support 8 in the case shown consists of a cross-head 80 fixed on the arm 5 by a pin 81 passed through the arm and through the cross-head 80, and working between holding and guiding surfaces on the bracket 7, and an outer bracket 83 fixed to the under side of the bottom 1. A rubber or like strip or jointing may be provided between say the plate 7× and the bracket 7; and in the pivot fitting below, in order to furnish a slight amount of elasticity in the arm fittings in the direction of motion of the roller carrier arms, the lower ends of same may fit slidably in the sockets, and secured below the socket with a nut or collar, having a metal or rubber spring between them.

In some cases springs may be used in connection with the arms or carriers of the rollers, either above or below their pivots, and may be adjustable so as to vary their pull or pressure, as the case may be, on the rollers, so that the pressure of the rollers against the pan wall may be increased or diminished at will, in order to meet cases where the degree of pressure desired and to be actually used, has to be regulated or a more or less definite one.

This object may be accomplished by changing the rollers from lighter to heavier, or vice versa, but this latter method is inconvenient, and less expeditious.

In this machine, if a roller becomes detached by say its spindle or carrier 5 breaking off at the bottom of the roller, the loose roller by its momentum in the circular path will fly to the pan wall, and would tend to revolve in the right direction due to its spinning motion, and the rotation of the pan bottom with it, and its friction on the pan walls, till it met the next fixed roller, which would also help it revolve in the right direction. The contact of this loose roller would be thus much less than would be the case of a loose roller in a stationary pan machine, with overhead carrier plates and rolls.

With regard to the effect of the rotary bottom 1 on which the material to be reduced falls, uneven pasting of the material is much less likely to take place, if not avoided altogether; whereas when a feed is delivered onto a stationary pan, there is always a position in the pan where the amount of feed or material preponderates, even if conducted in front of the rollers by pipes or chutes; whereas in this machine, no matter whether the material is centrally or otherwise fed, it would be thrown centrifugally to the pan grinding wall or surface evenly.

The crushed material passing through the screen 24 into the chamber 26, falls through the opening between the bridges 4× into the annular chamber 16, in which chamber fan blades 19 fixed on the underside of the pan bottom 1 work, and which create a minus pressure in this chamber and assist the flow of the material into it and through the screen and machine, and also its discharge from it, an opening or openings for which will be provided in the bottom of the chamber 16 at one or more suitable points.

A circular hoop forming part of or separate from the ring 4, may be used around the pan wall inside the screen, which guards the lower part of the screen against the action of the stuff delivered over the top of the crushing ring; and consequently the only material which will strike the screen at the lower exposed part will be the lighter part, as the heavier part which is calculated to damage the screen will not rise so high; but if this coarser material is required, the lifting vanes or devices 86 will give it.

On the rotatable pan bottom 1, inclined devices are provided for the purposes of lifting and distributing and controlling the material in the pan. One set of these vanes or devices marked 85 is adapted to deliver the material to be ground in a regulatable film or deposit in front of the rollers 3; while the other set, marked 86, delivers the ground material over and above the rollers and consequently to the screen 24; and these vanes or devices can be made to swivel outwardly by centrifugal force, till they reach a stop lying at a point between the device and the pan wall or ring 2. These devices are illustrated in Fig. 2.

The inclined device 85 is hinged at 87, and 88 is the adjustable or regulatable stop in the pan bottom 1, up against which the device would swing in action.

In addition to the devices 85, 86, an adjustable fan blade 89, or plurality of same are fixed on the bottom 1, and inclined in a direction shown to help to force the powder and air through the screen; and they may be any depth required; while in addition to these, one or more vertically and radially adjustable brushes 90 may be carried on the bottom 1, to brush the screen as the pan revolves, and prevent the clogging of same.

With regard to the inclined lifting device 86, this may be adjustable and in two parts as shown in detail in Fig. 1ª, the lower part being fixed on the pan bottom, and the upper part fixed on the lower, upon which it is adjustable vertically; and this part may have a flange 91 on its outer edge next the screen. By means of this device so formed, different grades or finenesses of material and such as are required may be produced, and even heavy material—which is sometimes required—can be obtained, as the action of the inclined device and its flange 91 is such that it will deliver the stuff at the required level onto the screen.

These devices therefore act as distributers, as it were, of the material onto the screen; and the flange 91 causes the devices to deliver the material higher up the screen than would occur if the vanes were planes.

For treating wet material in paste or semi-paste condition, the modification of pan shown in Fig. 9 may be used, in which case the material is delivered through a chute into an inner vessel or pan 93, having radial conduits or tubes 94 on it, which discharge the material centrifugally onto the crushing ring 2; so that the material will be deposited in quantity on the crushing surface in the required rate.

The rollers can be furnished with scrapers when dealing with this kind of material, for removing adhering material from them; and the pan bottom may be furnished with sliding or trap doors for the expeditious removal of this class of material; or it could be delivered by vanes over the pan walls through conduits into receptacles revolving with the pan bottom, or onto a stationary annular pan.

In this case, as in others, the pan bottom will revolve, and with it the inner pan 93 and conduit 94.

In a modification where wet material is to be operated upon, the driving shaft or pan revolving bottom may have radial blades or scoop arms on it, and the pan may be filled with material in bulk to be ground, and after being operated upon for the required length of time it may be emptied by the scoop arms, which when grinding will be raised up out of the material, but when it is required to empty the pan they are lowered into the material which lifts it out of the pan.

The machine shown is under-driven by the driving belt wheel 100 on the shaft 21; but if desired, it may be driven by a pulley or bevel wheels from above, in which case the shaft 21 would be extended upward, and through the chamber 23 and driven from that end; and the feed or supply conduits 65 would be placed to one side of the axis of the machine, or eccentric thereto.

What is claimed is:—

1. In a mill of the character described, a relatively stationary supporting ring, a grinding ring held therein, a rotatable bottom arranged beneath the relatively stationary supporting ring, means to rotate the bottom, a plurality of upstanding shafts connected with the bottom to rotate therewith and adapted to be shifted radially with relation to the bottom, rollers carried by the shafts and arranged to contact with the grinding ring, yielding means to oppose the inward radial movement of the shafts, and feeding means to supply material to be ground to said bottom and automatically operated by the inward radial movement of the shafts.

2. In a mill of the character described, a relatively stationary supporting ring, a grinding ring held therein, a rotatable bottom arranged near and beneath the supporting ring, means to rotate the bottom, a plurality of supports connected with the bottom and depending therefrom, a plurality of normally substantially vertical shafts pivotally connected with the supports to swing radially of the bottom and extending through and above the bottom, means to oppose the inward radial swinging movement of the shafts, rollers carried by the shafts and disposed to contact with the grinding ring, feeding mechanism arranged substantially centrally of the bottom to supply material thereto, and means operated by the movement of said shafts in a radial direction to adjust the feeding mechanism.

3. In a mill of the character described, a relatively stationary grinding ring, a bottom arranged near and beneath the same, means to support and rotate the bottom, a normally vertical shaft connected with the bottom and adapted to move radially with relation thereto, a roller carried by the shaft to contact with the grinding ring, a feed tube arranged above and near the bottom, a vertically movable shaft carrying a valve to control the passage of material from the feed tube, and a bell crank lever having connection with the first named shaft to be moved upon its radial movement and connected with the vertically movable shaft to shift it.

4. In a mill of the character described, a relatively stationary grinding ring, a bottom arranged near and beneath the same and provided with a radial opening, means to support and rotate the bottom, a support connected with the bottom and depending therefrom, a substantially vertical shaft pivotally connected with the support and projecting through the radial opening, a movable member to cover the opening and attached to the vertical shaft to be shifted thereby, a roller carried by the shaft and contacting with the grinding ring, and means to feed material upon the bottom.

5. In a mill of the character described, a stationary support including inner and outer spaced concentric rings, an annular trough arranged near and beneath said rings to receive material therefrom, a rotatable table disposed near said rings, vanes secured to the table and projecting into the annular trough, a grinding ring secured to the inner ring, a plurality of vertical shafts carried by the table and projecting above the same, rollers carried by the shafts to contact with the grinding ring, means to feed material to the central portion of the bottom, and means to rotate the bottom.

In testimony whereof we have signed our names to this specification in the presence of two subscribing witnesses.

DONALD JOHN GUNN MILLER.
RICHARD ASSHETON LLOYD.

Witnesses:
SOMERVILLE GOODALL,
PERCY SHARROCK.

Copies of this patent may be obtained for five cents each, by addressing the "Commissioner of Patents, Washington, D. C."